United States Patent [19]

Nabeshima et al.

[11] Patent Number: 4,955,010
[45] Date of Patent: Sep. 4, 1990

[54] CONSTANT VELOCITY TRACK JUMP SERVO SYSTEM FOR DISC PLAYERS

[75] Inventors: Daiki Nabeshima; Hiroshi Nakane, both of Yokohama, Japan

[73] Assignee: Kabushiki Kaisha Toshiba, Kawasaki, Japan

[21] Appl. No.: 228,844

[22] Filed: Aug. 3, 1988

Related U.S. Application Data

[63] Continuation of Ser. No. 885,711, Jul. 15, 1986, abandoned.

[30] Foreign Application Priority Data

Jul. 18, 1985 [JP] Japan .................. 60-159125

[51] Int. Cl.⁵ ............... G11B 21/08; G11B 7/085; G11B 21/10
[52] U.S. Cl. .................. 369/32; 369/41; 369/43; 369/44.11; 360/77.02; 360/78.04; 360/78.06
[58] Field of Search ........... 369/32, 33, 41, 43–46; 358/342, 907; 318/561, 592–594, 596, 615–617; 360/77.02–77.08, 77.11, 78.04–78.09, 78.11–78.14

[56] References Cited

U.S. PATENT DOCUMENTS

| | | | |
|---|---|---|---|
| 4,025,839 | 5/1977 | Maury | 360/78.05 |
| 4,031,443 | 6/1977 | Droux et al. | 318/561 |
| 4,166,970 | 9/1979 | Cardot et al. | 318/561 |
| 4,200,827 | 4/1980 | Oswald | 318/561 |
| 4,480,279 | 10/1984 | Hashimoto | 360/78 |
| 4,574,227 | 3/1986 | Herder et al. | 318/594 |
| 4,607,358 | 8/1986 | Maeda et al. | 369/44 |
| 4,615,023 | 9/1986 | Inada et al. | 369/32 |
| 4,622,604 | 11/1986 | Hashimoto et al. | 360/78 |

FOREIGN PATENT DOCUMENTS

| | | |
|---|---|---|
| 2513421 | 3/1983 | France . |
| 58-218053 | 12/1983 | Japan . |
| 59-68833 | 4/1984 | Japan . |
| 59-71138 | 4/1984 | Japan . |
| 59-71139 | 4/1984 | Japan . |
| 59-77641 | 5/1984 | Japan . |
| 59-77642 | 5/1984 | Japan . |

OTHER PUBLICATIONS

Patent Abstracts of Japan, vol. 9, No. 97, (P-352)[1820], Apr. 26th, 1985, 59-221877, Kashiwazaki.
Patent Abstracts of Japan, vol. 7, No. 192, (P-218)[1337], Aug. 23rd, 1983, 58-91559, Hosokawa.

*Primary Examiner*—Steven L. Stephan
*Assistant Examiner*—Steven R. Garland
*Attorney, Agent, or Firm*—Cushman, Darby & Cushman

[57] ABSTRACT

A record disc reproducing apparatus, which can be used for searching for a desired track location rapidly, including a pick-up device for reading data from the disc and which is movable is a radial direction with respect to the disc and a driver for driving the pick-up device radially with respect to the disc. The moving velocity of the pick-up device is detected and used to produce a velocity signal corresponding to the moving velocity. A kick signal is generated to energize the driver and is controlled so that the velocity signal approaches a predetermined reference velocity value. During track seeking the apparatus eliminates or removes the effects of phase compensation used during reproduction.

17 Claims, 7 Drawing Sheets

CONSTANT VELOCITY TRACK JUMP SERVO SYSTEM FOR DISC PLAYERS

This is a continuation of application Serial No. 06/885,711, filed July, 15, 1986, now abandoned.

BACKGROUND OF THE INVENTION

1. Field of the Invention

This invention relates generally to information reproducing systems capable of accessing a desired data or information record track on a disc-shape information carrier, and more particularly, to a track jump servo system for disc players having servos for positioning a transducer means rapidly and accurately to a desired record track location on a disc surface.

2. Background of the Invention

Digital record discs for recording information signals such as digitized audio signals, video or image signals have become quite common as have record disc reproducing apparatus for reproducing the recorded information data. Further, some digital record discs, e.g., so-called CDs (Compact Discs) have recently become used as ROM (Read Only Memory) devices for computers, called CD-ROMs. On such a digital record disc, digital data intended for high density recording are recorded in the form of a spiral bit string on one side thereof and reproduced through reading the bit string by means of transducer means such as an optical pick-up device using laser beams. The optical pick-up device of the record disc reproducing apparatus follows the bit string by means of a tracking control system. CD players or video disc players are further used to process the read-out signal in a predetermined manner so as to convert the signal into a replica of the original analog signal which was recorded, i.e., an audio or video signal as an output.

As is well known, address information may also be recorded on the record disc which may be detected for search and track jump operation so that reproduction at a desired track location can be easily and quickly achieved. In particular, a selected address corresponding to the desired track location is preset, and the pick-up device is rapidly moved across or traverses to the track until the desired track corresponding to the selected address is reached. During such searching, a distance that the pick-up device should jump or traverse is calculated by, for example, a computer in accordance with the address of the track at which the pick-up device is presently located and the address of the desired track. Then the pick-up device is moved by the distance radially across the disc by applying a predetermined, fixed voltage to a driver such as a voice coil, moving coil or linear motor. The fixed voltage causes the pick-up device to continuously accelerate until the voltage ceases.

In a short distance search operation of only a few tracks, the pick-up device can jump to the desired track relatively accurately. In a long distance search operation, however, to a track located dozens of tracks away from the track at which the pick-up device is presently located, the pick-up device does not become accurately placed on the desired track for a long time. During a long distance search operation, the actual distance that the pick-up device has moved is apt to differ from the desired distance calculated by the computer. As the distance the pick-up device should jump, or traverse becomes longer, a track at which the pick-up device has been placed at the end of the jump may differ more from the desired track due to mechanical loss or non-uniformity in the mechanism for transferring the pick-up device, inertia of the pick-up device, temperature conditions, the unpredictable speed when the desired track is reached and the like.

Therefore, the search operation includes repeated track jumps so that the pick-up device gradually approaches the desired track location. After every track jump in the search operation, the track address is checked to determine whether a track where the pick-up device has been placed after the track jump coincides with the desired track or not.

As a result, it is difficult to ensure that the pick-up device jumps over or traverses rapidly and accurately the record tracks to a desired track location on the disc.

SUMMARY OF THE INVENTION

Accordingly, it is an object of the present invention to provide an information reproducing system capable of rapidly and accurately accessing a desired data or information record track on a discshaped information carrier.

It is another object of the present invention to provide a track jump servo system for disc players having servos for positioning a transducer means rapidly and accurately to a desired record track location on a disc surface.

It is still another object of the present invention to provide a track jump servo system for disc players which is able to avoid the abovedescribed difficulties encountered with the prior art.

These and other objects of the present invention are achieved in a record disc reproducing apparatus for use in reproducing data stored thereon having a pick-up device for reading data from the disc and movable in a radial direction with respect to the disc. The moving velocity of the pick-up device is detected, and a velocity signal corresponding to the moving velocity is produced. A kick signal generator supplies the driver for the pick-up device with a driving kick signal. The kick signal generator controls the kick signal so that the velocity signal coincides with a reference voltage signal to maintain the speed of the pick-up device at a predetermined constant value. As a result, much more precise control during a search operation is possible.

BRIEF DESCRIPTION OF THE DRAWINGS

Additional objects, advantages, and features of the present invention will further become apparent to persons skilled in the art from a study of the following description and of the accompanying drawings, in which:

FIGS. 5a–5l and FIGS. 6a–6l are timing charts used to explain the modes of short distance and long distance search operations of the third embodiment shown in FIGS. 4a and 4b.

DESCRIPTION OF THE PREFERRED EMBODIMENTS

The present invention will now be described in detail with reference to FIGS. 1 to 6. Throughout the drawings, like reference numerals or letters are used to designate like or equivalent elements.

Figure 1:
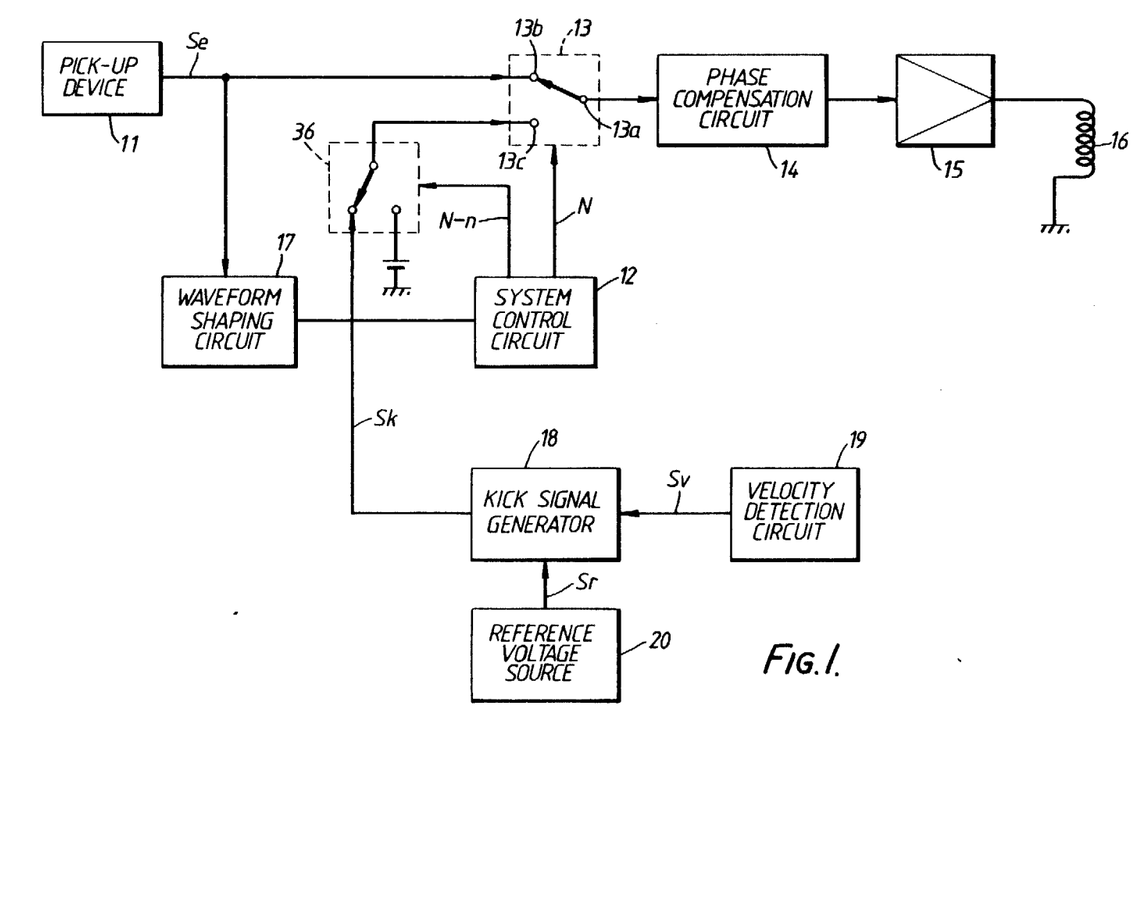
FIG. 1 is a block diagram of a first embodiment of the present invention.

Referring first to FIG. 1, description will be made of a fundamental block diagram of a track jump servo system for disc players according to the present invention.

In FIG. 1, a tracking error signal Se obtained in response to deviation of a pick-up device 11 from the center of the record track then being scanned is supplied to a fixed contact 13b of a switch 13. A velocity detection circuit 19 is provided for detecting mechanically or electrically a moving speed of pick-up device 11 and generates a velocity signal Sv. Velocity detection circuit 19 is provided, for example, on pick-up device 11 or a guide, etc., thereof. Velocity signal Sv outputted from velocity detection circuit 19 is supplied to an input terminal of a kick signal generator circuit 18. Kick signal generator circuit 18 compares velocity signal Sv with a reference voltage signal Sr supplied to another input terminal of kick signal generator 18 from a reference voltage source 20 so that a kick signal Sk is generated as described in detail later. Kick signal Sk generated from kick signal generator circuit 18 is supplied to another fixed contact 13c of switch 13.

In the information reproducing mode, a movable contact 13a of switch 13 is coupled to fixed contact 13b by means of a command from system control circuit 12, so that tracking error signal Se on fixed contact 13b is supplied to a tracking actuator 16 for pick-up device 11 (represented by a coil symbol in the drawing) through a series circuit of a phase compensation circuit 14 and an amplifier 15. Therefore, tracking actuator 16 controls an objective lens (not shown) in pick-up device 11 according to tracking error signal Se so as that pick-up device 11 follows a predetermined record track on the optical disc correctly. For example, tracking actuator 16 may be a well known voice coil, moving coil or linear motor. Therefore, a tracking servo control for pick-up device 11 is performed.

When an information search mode for accessing a desired record track location is requested, system control circuit 12 calculates a number of record tracks that the pick-up device 11 should jump over or traverse, in other words, the number of record tracks between a record track then being scanned and the desired record track to be searched. Also, system control circuit 12 commands switch 13 to change movable contact 13a of switch 13 to fixed contact 13c. Kick signal generator circuit 18 then supplies fixed contact 13c with kick signal Sk. Kick signal Sk is then supplied to tracking actuator 16 through phase compensation circuit 14 and amplifier 15 in place of tracking error signal Se. Therefore, tracking actuator 16 drives the objective lens in pick-up device 11 according to kick signal Sk so that pick-up device 11 jumps over or traverses to the desired record track location radially relative to the optical disc.

The moving speed of the pick-up device is detected by velocity detection circuit 19 as described before and then fed back to kick signal generator circuit 18 as velocity signal Sv. Kick signal generator circuit 18 controls its output, i.e., kick signal Sk so that velocity signal Sv coincides with reference voltage signal Sr. In other words, the pick-up device is servo-controlled so that it moves at a constant speed in correspondence with reference voltage signal Sr.

During the search operation, system control circuit 12 counts pulses in tracking error signal Se supplied through a waveform shaping circuit 17 from pick-up device 11. In waveform shaping circuit 17, tracking error signal Se is modified to a rectangular pulse waveform. When a count of pulses coincides with the number of record tracks as calculated, system control circuit 12 commands switch 13 so that movable contact 13a of switch 13 is again coupled to fixed contact 13b. Then the record disc reproducing apparatus is changed from an information search mode for accessing the desired record track location to an information reproducing mode, and the tracking servo control for pick-up device 11 is reestablished.

According to the above embodiment the moving velocity of pick-up device 11 is servocontrolled so that it is able to stop at a desired track location with a minimal possibility of failure by only one search operation. Therefore, the search operation for accessing a desired track location is performed within a very short time.

As illustrated in FIG. 1, switch 36 may also be provided having one fixed terminal connected to kick signal generator 18, another fixed terminal connected to a voltage source which causes a slowing of pick-up 11 when applied to tracking actuator 16 and a movable terminal connected to switch 13. Control circuit 12 controls switch 36 to connect kick signal generator 18 to switch 13 during most of a search operation. However, when system control circuit 12 determines that pick-up device 11 is within a predetermined number of tracks, e.g., one or two tracks of the desired track, control circuit 11 changes switch 36 to connect the voltage source to tracking actuator 16 to slow pick-up 11, producing an even more assured positioning when the desired track is reached.

Figure 2:
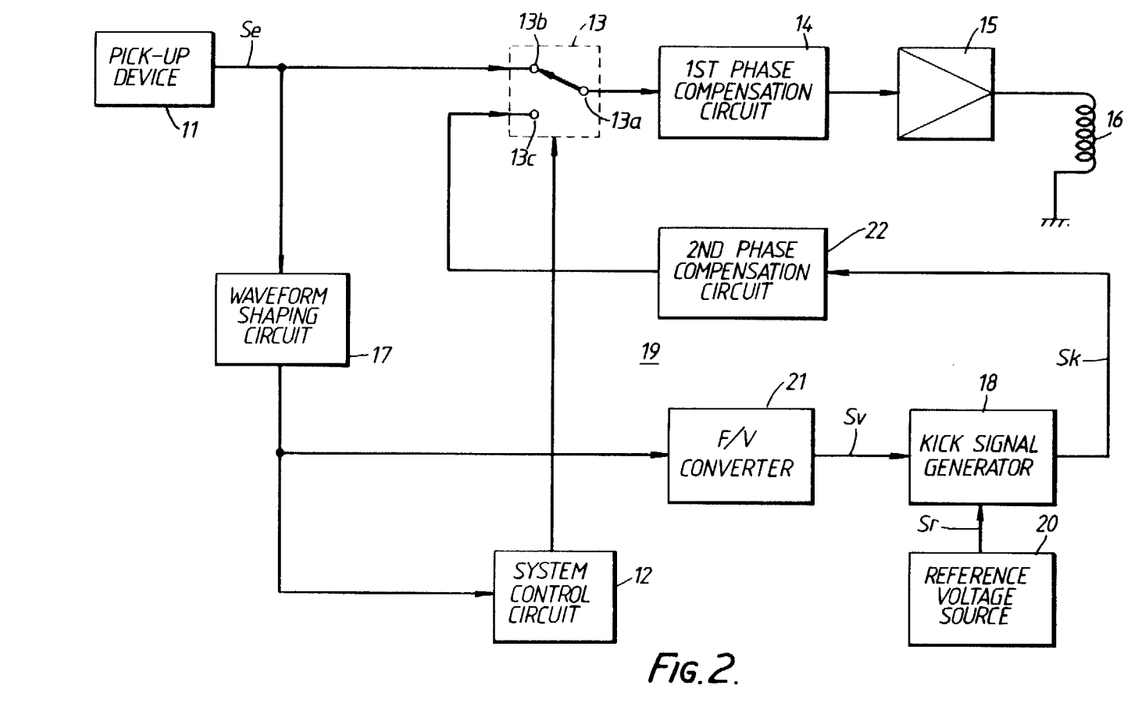
FIG. 2 is a block diagram of a second embodiment of the present invention.

Referring now to FIG. 2, a second embodiment of the record disc reproducing apparatus according to the present invention will be described. The second embodiment is contructed and improved from the first embodiment shown in FIG. 1. Therefore, descriptions for portions equivalent to those in the first embodiment shown in FIG. 1 will be made as the occasion may demand.

In FIG. 2, velocity detection circuit 19 is comprised of a frequency-to-voltage converter (F/V converter) 21 connected to waveform shaping circuit 17. F/V converter 21 generates a velocity signal Sv with a voltage corresponding to a frequency of pulses in tracking error signal Se. Further, kick signal Sk generated from kick signal generator circuit 18 is supplied to second fixed contact 13c of switch 13 through a second phase compensation circuit 22 for reverse-compensating the phase compensation of first phase compensation circuit 14 connected between switch 13 and amplifier 15.

First phase compensation circuit 14 usually stabilizes the tracking servo control loop in the reproducing mode. First phase compensation circuit 14, therefore, must be deactivated in the search mode. Although it is possible to deactivate first phase compensation circuit 14 in other ways, for example, short-circuiting it in the search mode, first phase compensation circuit 14 fails to be initialized when the reproducing mode has again started. In the second embodiment, therefore, first phase compensation circuit 14 is always activated both in the reproducing and search modes, while second phase compensation circuit 22 having an opposite characteristic to first phase compensation circuit 14 virtually eliminates phase compensation due to first phase compensation circuit 14.

Other than for the source of the velocity signal, the embodiment of FIG. 2 operates in the same manner as the embodiment of FIG. 1.

Figure 3:
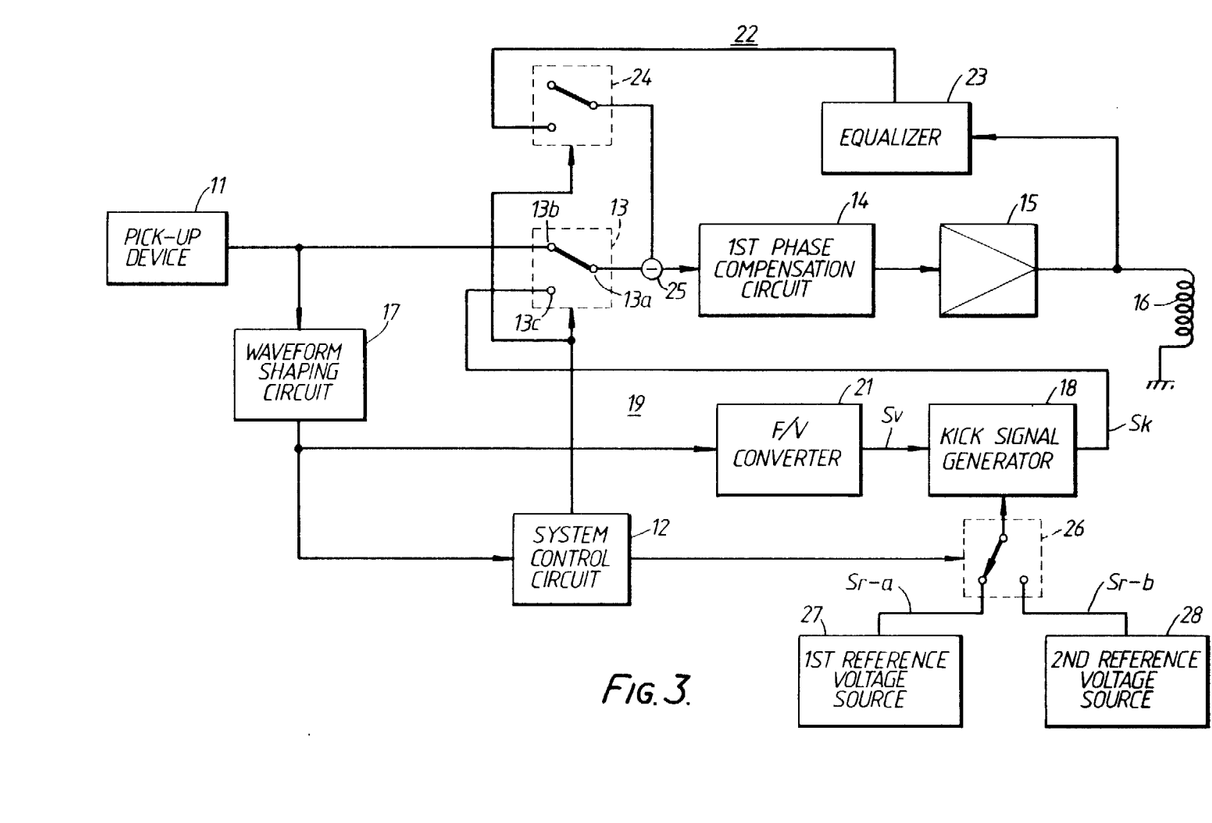
FIG. 3 is a block diagram of a third embodiment of the present invention.

Referring now to FIG. 3, a third embodiment of the record disc reproducing apparatus according to the present invention will be described. The third embodiment represents a modification of the second embodiment shown in FIG. 2. Therefore, descriptions for portions equivalent to those in the prior embodiments shown in FIGS. 1 and 2 will be made as the occasion may demand.

In FIG. 3, second phase compensation circuit 22 is comprised of an equalizer circuit 23 and a second switch 24 connected in series on a feedback path provided in parallel with the series circuit of first phase compensation circuit 14 and amplifier 15. That is, the feedback path is connected between the output end of amplifier 15 and a subtraction circuit 25 provided prior to the first phase compensation circuit 14. Second switch 24 is controlled by a command from system control circuit 12 so that the coupling of the feedback path to subtraction circuit 25 is activated in the search mode. Subtraction circuit 25 operates to subtract an output of equalizer circuit 23 from kicks signal SK supplied to first phase compensation circuit 14 in the search mode.

Further, first and second reference voltage sources 27 and 28 are provided for being selectively connected to kick signal generator circuit 18 through a third switch 26 which is also controlled by a command from system control circuit 12.

In the third embodiment, first phase compensation circuit 14 is also activated both in the reproducing and the search modes, but its effect is virtually eliminated due to the subtraction of the output of equalizer circuit 23 from kick signal SK. First and second reference voltage sources 27 and 28 generate respectively a reference voltage signal Sr-a and another reference voltage signal Sr-b which is lower than the former signal Sr-a. System control circuit 12 commands third switch 26 so that first reference voltage source 27 is connected to kick signal generator circuit 18 first in the search mode and then second reference voltage source 28 is connected to kick signal generator circuit 18 for a predetermined period remaining in the search mode. Accordingly, pick-up device 11 is moved at relatively rapid speed to a vicinity of a desired track location first by kick signal Sk corresponding to the higher reference voltage signal Sr-a. Then pick-up device 11 is moved at a relatively slow speed to the desired track location by kick signal Sk corresponding to the lower reference voltage signal Sr-b. The switching operation of switch 26 from first reference voltage source 27 to second reference voltage source 28 is made by system control circuit 12 at a timing that a count of pulses in tracking error signal Se coincides with a value smaller than the number of tracks between the track location where pick-up device 11 had been located prior to the search mode operation and the desired track location by a predetermined value.

Figure 4A:
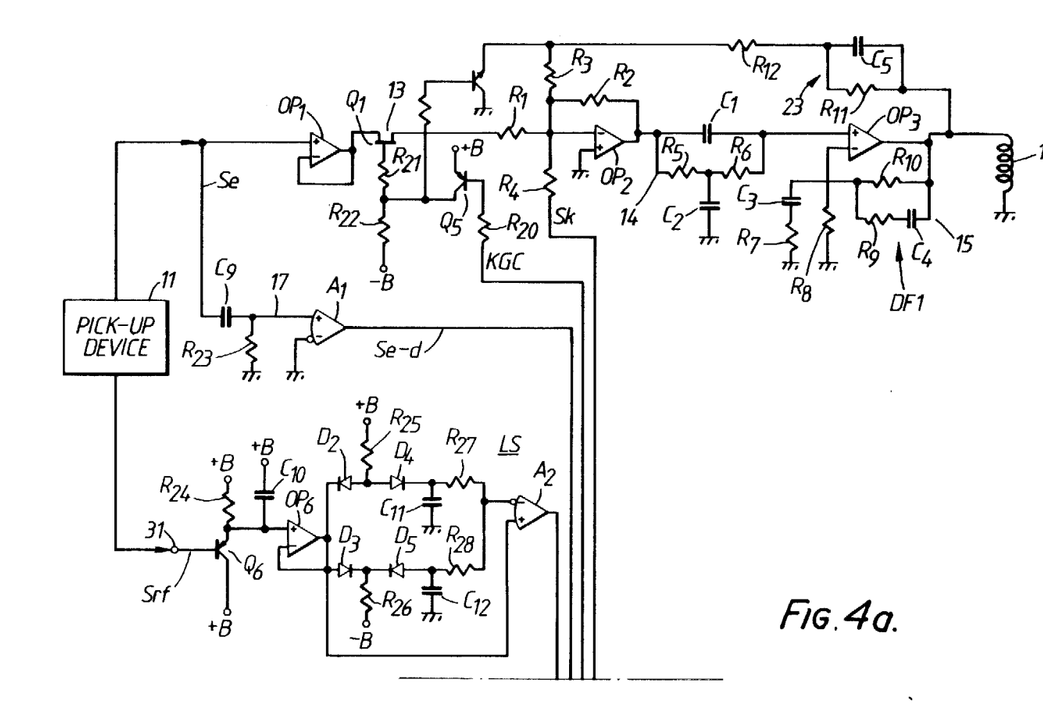
FIGS. 4a and 4b together constitute is a practical circuit arrangement for the third embodiment of the present invention.
Figure 4B:
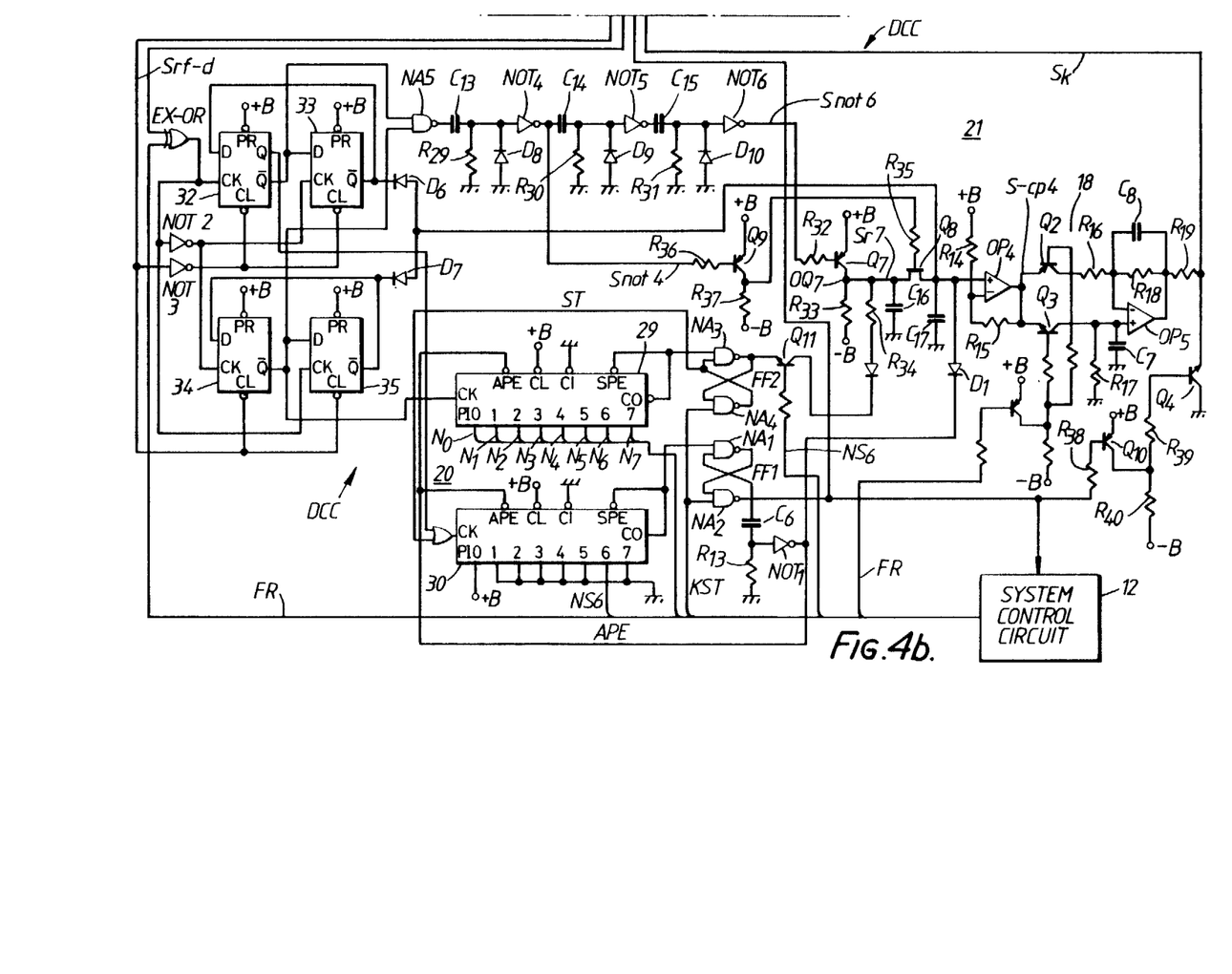

FIG. 4 shows a practical circuit arrangement embodying the third embodiment of the record disc reproducing apparatus according to the present invention as shown in FIG. 3. An operation of the record disc reproducing apparatus shown in FIG. 4 will be described hereinafter with reference to the graph diagrams of FIGS. 5 and 6. An explanation of its circuit construction will be also made properly in the description.

In a reproducing mode, a tracking error signal Se from pick-up device 11 is supplied to an FET (Field Effect Transistor) Q1 which operates as first switch 13 in FIG. 3 (the same in below description) through an operational amplifier OP1. FET Q1 is rendered conductive in the reproducing mode as described later. Tracking error signal Se is then introduced to tracking actuator 16 via a series circuit of phase compensation circuit 14 comprised of an operational amplifier OP2 for its main component and amplifier 15 comprised of an operation amplifier OP3 for its main component.

When a search mode for accessing any desired track location is requested, system control circuit 12 produces a set of data N0 to N7, a data NS6 and a direction signal FR. Data N0 to N7 represent the number of tracks that pick-up device 11 should jump over, and they are supplied to a counter 29. Data NS6 changes the moving speed of pick-up device 11 and is supplied to a counter 30. Direction signal FR determines the direction that pick-up device 11 should move. System control circuit 12 further produces a set-up signal KST. Set-up signal KST initiates generation of kick signal Sk by actuating a flipflop circuit FF1 comprised of NAND gates NA1 and NA2, a set-up circuit comprised of a resistor R13 and a capacitor C6, an inverter NOT1, a diode D1, operational amplifiers OP4 and OP5, transistors Q2 to Q4, resistors R14 to R19 and capacitors C7 and C8. Kick signal Sk is supplied from an output side of resistor R19 to operational amplifier OP2 and is then introduced into tracking, actuator 16 via the series circuit of operational amplifiers OP2 and OP3 and differentiator circuit DF1. At the approximate time, an output signal APE of inverter NOT1 is supplied to counters 29 and 30 for starting the count operations thereof. An output signal KGC from NAND gate NA2 is also supplied to the gate terminal of FET Q1 for deactivating it through a circuit comprised of transistor Q5 and resistors R20 to R22 at the same time. Thus, the tracking servo control loop is cut off in the search mode.

Figure 5:
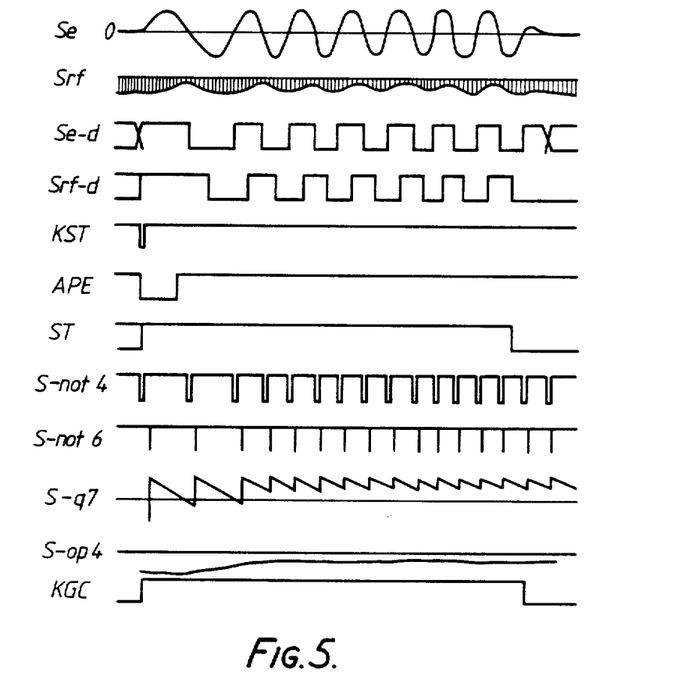

Here, an example in which pick-up device 11 jumps over seven tracks will be explained using the chart shown in FIG. 5. In this case, the set of data N0 to N7 is set as "1110000" in response to the number of tracks, seven, while data NS6 is set as "0". That is, data N0 to N2 are H (high) levels, while data N3 to N7 and NS6 are L (low) levels. On the other hand, it is assumed that direction signal FR is L level. Where the track jumps in the outward and the inward directions relative to the record disc, the level of direction signal FR is L and H, respectively.

When a jump of pick-up device 11 has started, tracking error signal Se is supplied to wave shaping circuit 17 comprised of comparator A1 through a differentiator circuit comprised of a capacitor 9 and a resistor R23. In comparator A1, tracking error signal Se is compared with a ground level signal so that it is converted to a digital tracking error signal Se-d of rectangular waveform as shown in FIG. 5.

Further, the circuit shown in FIG. 4a has another input terminal 31 for receiving a signal Srf, i.e., a recorded information signal read by pick-up device 11. Signal Srf on input terminal 31 is supplied to a level slice circuit LS comprised of operational amplifier OP6, diodes D2 to D5, capacitors C11 and C12, resistors R25 to R28, positive and negative DC sources +B and −B, and a comparator A2 through a transistor Q6. In level slice circuit LS, RF signal Srf is sliced by a signal which is automatically adjusted to a level at the center point between the maximum amplitude and minimum amplitude of the RF signal. In this manner, RF signal Srf is converted to a digital information signal Srf-d which is identical to an original digital signal before it was recorded on the record disc.

Digital tracking error signal Se-d, digital information signal Srf-d and direction signal FR are supplied to F-V converter 21 comprised of a transistor Q7, an FET Q8, resistors R32 to R35, and capacitors C16 and C17, through a direction control circuit DCC comprised of an exclusive-OR (EX-OR) gate, D-type flip-flops (D-FFs) 32 to 35, inverters NOT2 to NOT6, diodes D6 to D10 NAND gate NA5, capacitors C13 to C15, and resistors R29 to R31. In direction control circuit DCC, inverters NOT4 and NOT6 produce pulse signals S-not4 and S-not6 respectively, whose periods vary in response to the moving speed of pick-up device 11 as shown in FIG. 5. Output signal S-not6 of inverter NOT6 controls the operation of transistor Q7 so that an output signal S-q7 with a saw-tooth waveform as shown in FIG. 5 is produced on the collector terminal of transistor Q7. The saw-toothwaveform of output signal S-q7 has a period which varies in response to the moving speed of pick-up device 11. Output signal S-q7 is supplied to operational amplifier OP4 in kick signal generator circuit 21 through FET Q8 which is controlled by output signal S-not4 of NOT4. Therefore, operational amplifier OP4 produces an output signal S-op4 with a relatively constant amplitude as shown in FIG. 5. Kick signal generator circuit 21 then generates kick signal Sk.

System control circuit 12 calculates a number of pulses to be counted in digital tracking error signal Se-d. When the count coincides with the number, seven as set in counter 29, system control circuit 12 quits generation of set-up signal KST. In other words, set-up signal KST assumes a L level at that time. Output signal KGC from NAND gate NA2 assumes a L level in response to the L level state of set-up signal KST. Therefore, FET Q1 is switched ON and the tracking servo control starts. While signal KGC is a L level, it is introduced into the base terminal of a transistor Q4 through a transistor Q10. Transistor Q4 is switched OFF in response to the L level state signal, KGC. Therefore, the output end of resistor R19 is grounded, and the generation of kick signal Sk is prohibited.

Next, another example will be described with respect to FIG. 6 in which pick-up device 11 jumps over one hundred and fourteen tracks.

When the number of tracks to be jumped is greater than a predetermined number, e.g., sixtyfour, pick-up device 11 is moved at a rapid speed for all but the last predetermined number of tracks and is then slowed down. In this case, data N0 to N7 are set to "01001100" in response to the number.. of tracks to be jumped at the highest speed, i.e., one hundred and fourteen less sixty-four. Also, data NS6 is set to "1". That is, data N1, N4, N5, and NS6 are H levels, while data N0, N2, N3, N6 and N7 are L levels. On the other hand, it is assumed that direction signal FR is also a L level.

When set-up signal KST is produced from system control circuit 12, pick-up device 11 starts the track jump for the accessed track location as set forth. Transistor Q11 becomes conductive in response to data NS6 which is a H level as described before. Kick signal generator circuit 21 is therefore given reference signal Sr of higher voltage Sr-a as set by resistors R33 and R34, corresponding to voltage reference signal Sr of higher 27 and 28 in FIG. 3. Operational amplifier OP4 produces its output signal S-op4 of higher amplitude, too. Therefore, pick-up device 11 moves at a relatively rapid speed.

When the count in counter 29, of digital tracking error signal pulses reaches the number fifty (one hundred and fourteen less sixty-four), counter 29 outputs a H level to a flip-flop FF2 comprised of NAND gates NA3 and NA4 so that the output of NAND gate NA3 is changed to a H level. Transistor Q11 is then switched OFF in response to the H level applied on its emitter terminal from NAND gate NA3. This causes pick-up device 11 to move at a slower speed as in the prior example. Simultaneously the output of NAND gate NA4 is supplied to counter 30 so that counter 30 starts its count operation for the pulses in digital tracking error signal Se-d.

When the count in counter 30 reaches a number, sixty four, the output of counter 30 becomes a H level. The H level output of counter 30 then makes signal KGC on the output of NAND gate NA2 become a L level. As a result, pick-up device 11 is stopped after the trackjump over fifty tracks plus sixty-four tracks, i.e., one hundred and fourteen tracks is performed.

Figure 6:
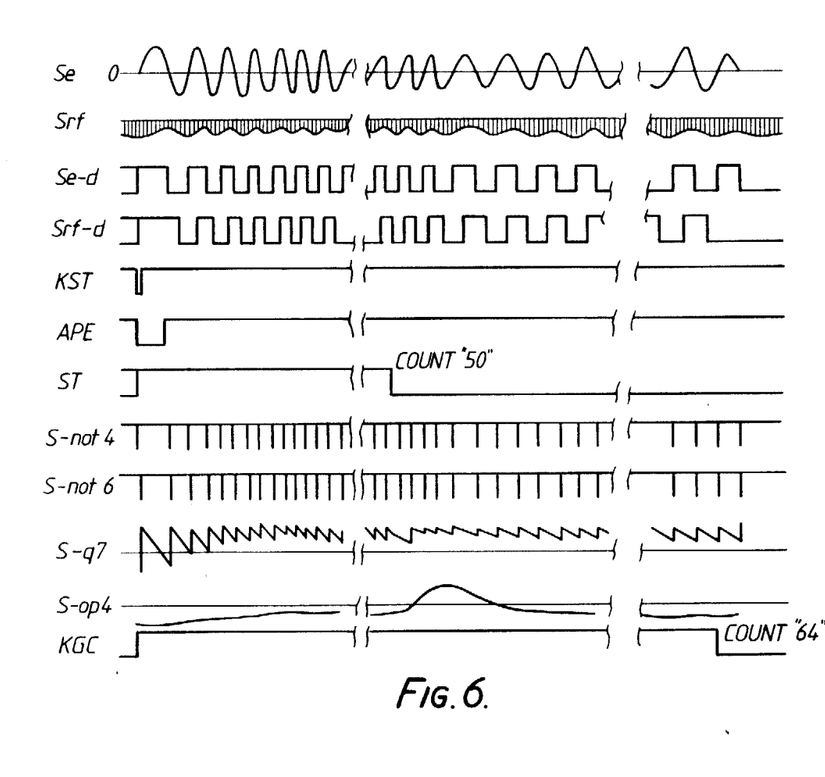

According to one aspect of the present invention as shown in FIG.6, a number of tracks to be traversed is freely set by data N0 to N7 and NS6.

Although only a few embodiments have been described in detail above, those skilled in the art will appreciate that many modifications are possible in the preferred embodiments without materially departing from the novel teachings and advantages of the present invention. Accordingly, all such modifications are intended to be included in the present invention as defined by the following claims.

What is claimed is:

1. A record disc reproducing apparatus comprising:
   a pick-up device for reading data from a disc;
   means for moving said pick-up device radially across said disc, said moving means including a first phase compensation circuit with a first phase compensation characteristic for stabilizing the pick-up device in a reproducing mode;
   means for producing a velocity signal corresponding to a moving velocity of said pick-up device;
   kick signal generating means for comparing said velocity signal to a reference velocity signal and generating a kick signal used to control said moving means so as to cause said velocity signal to approach a value of said reference velocity signal;
   a second phase compensation circuit having a second characteristic different from said first characteristic, said second phase compensation circuit being responsive to said kick signal and having an output which is connected to an input of said first phase compensation circuit in a search mode, so as to eliminate an effect of the phase compensation of said first phase compensation circuit when the pick-up device is in said search mode; and
   control means for selectively applying said kick signal to said moving means during said search mode to cause said pick-up device to move at a velocity corresponding to said reference velocity signal.

2. Apparatus according to claim 1, wherein said control means includes means for determining a number of tracks crossed as said moving means moves said pick-up device and means for deenergizing said moving means when a desired number of tracks have been crossed.

3. A record disc reproducing apparatus according to claim 2, wherein said kick signal generating means comprises a reference velocity voltage supply for supplying a first reference velocity signal having a high voltage value and a second reference velocity signal having a low voltage value, respectively, and comparing means for comparing said velocity signal to said first reference velocity signal for producing a first comparison result used for generating a first kick signal which is applied to said moving means to drive said pick-up device at a high speed until said pick-up device comes within a predetermined number of tracks from a desired track, and for comparing said velocity signal to said second reference velocity signal for producing a second comparison result used for generating a second kick signal which is applied wot said moving means to drive said pick-up device at a low speed until said desired track is reached.

4. Apparatus according to claim 1 wherein said control means includes means for determining a number of tracks crossed as said moving means moves said pick-up device, and means for causing said moving means to apply a force to said pick-up device opposing movement of said pick-up device when said control means determines that said pick-up device is within a predetermined number of tracks from a desired track.

5. A record disc reproducing apparatus according to claim 1, wherein an input of said second phase compensation circuit is connected to an output of said kick signal generating means and further comprising a switch for connecting said output of said second phase compensation circuit to said input of said first phase compensation circuit, during said search mode.

6. A record disc reproducing apparatus according to claim 1, wherein an input of said second phase compensation circuit is connected to an output of said first phase compensation circuit and further comprising a switch and a subtractor, said switch for connecting an equalizing output of said second phase compensation circuit to a first input of a subtractor, said subtractor receiving said kick signal at a second input thereof during said search mode, an output of said subtractor being provided to said first phase compensation circuit so as to form, during said search mode, a feedback path comprising said first and second phase compensation circuits, said switch and said subtractor.

7. Apparatus as in claim 1, wherein said moving means further comprises tracking means, for tracking said pickup device and producing an error signal indicative of said tracking; and
means for waveshaping said error signal into a wave shaped error signal; and
wherein said producing means uses said wave shaped error signal to produce said velocity signal.

8. An apparatus as in claim 7, wherein said producing means includes frequency to voltage converting means for converting a frequency of said wave shaped error signal into said velocity signal.

9. A record disc reproducing apparatus for use in reproducing data stored thereon, comprising:
a pick-up device for reading data from a disc and which is movable in a radial direction with respect to said disc;
means for driving said pick-up device with respect to said disc, said driving means producing an output signal for driving said pick up device, said output signal including a phase stabilization for a reproducing mode;
means for detecting a moving velocity of said pick-up device and producing a velocity signal corresponding to the moving velocity;
a source for supplying a reference voltage signal;
means for comparing said velocity signal with said reference voltage signal and generating a kick signal in response to the comparison and supplying said pick-up device driving means with said kick signal so that said detected velocity signal assumes a predetermined fixed relation with respect to said reference voltage signal; and
a feedback path for subtracting an equalizing component from said kick signal to substantially remove said phase stabilization when said record disc reproducing apparatus is in a search mode.

10. A record disc reproducing apparatus according to claim 9, wherein said velocity detecting means includes means for generating a signal corresponding to the moving velocity of said pick-up device.

11. A record disc reproducing apparatus according to claim 10, wherein said generating means includes frequency generator means for generating a frequency signal corresponding to the velocity of said pick-up device.

12. A record disc reproducing apparatus according to claim 9, wherein said velocity detecting means includes means for sensing a pickedup signal read by said pick-up device.

13. A record disc reproducing apparatus according to claim 12, wherein said sensing means includes means for monitoring a ripple component of said picked-up signal.

14. A record disc reproducing apparatus according to claim 12, wherein said sensing means is responsive to a tracking error signal read by said pick-up device.

15. A record disc reproducing apparatus according to claim 12, wherein said sensing means is responsive to a ripple component and a tracking error signal read by said pick-up device.

16. A record disc reproducing apparatus for use in reproducing data stored thereon, comprising:
a pick-up device for reading data from a disc and which is movable in a radial direction with respect to said disc;
means for driving said pick-up device radially with respect to said disc;
means for detecting a moving velocity of said pick-up device and producing a velocity signal corresponding to the moving velocity;
a source for supplying a reference voltage signal;
means for generating a kick signal and supplying said pick-up device driving means with said kick signal, said kick signal generating means comparing said velocity signal with said reference voltage signal and controlling said kick signal in response to the comparison so that said detected velocity signal assumes a predetermined fixed relation with respect to said reference voltage signal;
a feedback path for subtracting an equalizing output of said pick up device driving means from said kick signal when said record disc reproducing apparatus is in a search mode;
switch means for selectively connecting one of a picked-up signal read by said pick-up device and said kick signal to said pick-up device driving means;

means for determining a distance that said pickup device should jump when said search mode is requested for accessing a desired track location;

means for detecting when said pick-up device reaches the desired track location; and means for commanding said switch means to select a connection to said kick signal when said search mode is requested and to select a connection to said pick-up signal when said desired track location has been detected.

17. A record disc reproducing apparatus according to claim 16, wherein said reference voltage signal source selectively provides a first reference voltage signal and a second reference voltage signal higher than said first reference voltage signal and said apparatus further comprises means of controlling said reference voltage signal source so that it provides said second reference voltage signal to said kick signal generating means until the pick-up device has jumped the distance determined by said distance determining means and then provides said first refernece voltage signal to said kick signal generating means until the desired track location is reached by said pick-up device.

* * * * *